United States Patent
Ding et al.

(10) Patent No.: US 9,674,284 B2
(45) Date of Patent: Jun. 6, 2017

(54) METHOD AND DEVICE FOR DETECTING STATE OF NETWORKING CHANNEL

(71) Applicant: XIAOMI INC., Beijing (CN)

(72) Inventors: Yi Ding, Beijing (CN); Yanlu Zhang, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/985,571

(22) Filed: Dec. 31, 2015

(65) Prior Publication Data

US 2016/0308972 A1    Oct. 20, 2016

(30) Foreign Application Priority Data

Apr. 16, 2015 (CN) .......................... 2015 1 0181723

(51) Int. Cl.
| | |
|---|---|
| *H04M 3/00* | (2006.01) |
| *H04L 29/08* | (2006.01) |
| *H04L 12/26* | (2006.01) |
| *H04L 12/28* | (2006.01) |
| *H04W 4/00* | (2009.01) |
| *H04B 17/00* | (2015.01) |
| *H04W 72/04* | (2009.01) |
| *H04W 88/02* | (2009.01) |

(52) U.S. Cl.
CPC ....... *H04L 67/125* (2013.01); *H04B 17/0085* (2013.01); *H04L 12/2823* (2013.01); *H04L 43/065* (2013.01); *H04W 4/005* (2013.01); *H04W 72/0433* (2013.01); *H04W 88/02* (2013.01)

(58) Field of Classification Search
USPC .................................................. 455/418, 419
See application file for complete search history.

(56) References Cited

U.S. PATENT DOCUMENTS

| | | |
|---|---|---|
| 7,047,092 B2 | 5/2006 | Wimsatt |
| 2014/0098247 A1 | 4/2014 | Rao et al. |
| 2014/0153417 A1 | 6/2014 | Gupta et al. |

(Continued)

FOREIGN PATENT DOCUMENTS

| | | |
|---|---|---|
| CN | 103198144 A | 7/2013 |
| CN | 103684897 A | 3/2014 |

(Continued)

OTHER PUBLICATIONS

International Search Report of PCT/CN2015/090401, mailed from the State Intellectual Property Office of China on Jan. 18, 2016.

(Continued)

*Primary Examiner* — Joel Ajayi
(74) *Attorney, Agent, or Firm* — Finnegan, Henderson, Farabow, Garrett & Dunner LLP

(57) ABSTRACT

The present disclosure is directed to a method and device for detecting a state of a networking channel. The method includes: determining a smart device to be detected; selecting an Internet of Things (IoT) control protocol used by the smart device, and accessing an IoT server via a networking channel used by the smart device; and collecting a state of the networking channel during the accessing of the IoT server, and presenting the collected state on a screen of a terminal.

15 Claims, 12 Drawing Sheets

(56) References Cited

U.S. PATENT DOCUMENTS

2014/0274005 A1    9/2014  Luna et al.
2014/0369231 A1   12/2014  Chen et al.
2015/0156266 A1*   6/2015  Gupta .................... H04L 67/12
                                                        709/224

FOREIGN PATENT DOCUMENTS

| CN | 204069010 U | 12/2014 |
|----|-------------|---------|
| CN | 104394051 A | 3/2015 |
| CN | 104407592 A | 3/2015 |
| CN | 104460329 A | 3/2015 |
| CN | 104917632 A | 9/2015 |
| RU | 130098 U1 | 7/2013 |
| WO | WO 02/099683 A1 | 12/2002 |

OTHER PUBLICATIONS

Extended European Search Report of European Patent Application No. 16151333.8, from the European Patent Office, dated Sep. 9, 2016.
Decision to Grant a Patent for an Invention for Russian Application No. 2015152506/07(080918), dated Mar. 22, 2017.

* cited by examiner

METHOD AND DEVICE FOR DETECTING STATE OF NETWORKING CHANNEL

CROSS-REFERENCE TO RELATED APPLICATIONS

The present application is based upon and claims priority to Chinese Patent Application No. 201510181723.0, filed Apr. 16, 2015, the entire contents of all of which are incorporated herein by reference.

TECHNICAL FIELD

The present disclosure generally relates to the smart home technology and, more particularly, to a method and device for detecting a state of a networking channel.

BACKGROUND

Internet of Things (IoT) is a network formed by combining various information sensing devices and Internet. The IoT may facilitate identification and management of the connected devices. For example, after a smart device, such as a smart home appliance, is connected to the IoT, a user may remotely control the smart device and enjoy the smart home experience.

SUMMARY

According to a first aspect of the present disclosure, there is provided a method for detecting a state of a networking channel, the method comprising: determining a smart device to be detected; selecting an Internet of Things (IoT) control protocol used by the smart device, and accessing an IoT server via a networking channel used by the smart device; and collecting a state of the networking channel during the accessing of the IoT server, and presenting the collected state on a screen of a terminal.

According to a second aspect of the present disclosure, there is provided an electronic device, comprising: a processor; a screen; and a memory for storing instructions executable by the processor; wherein the processor is configured to perform: determining a smart device to be detected; selecting an Internet of Things (IoT) control protocol used by the smart device, and accessing an IoT server via a networking channel used by the smart device; and collecting a state of the networking channel during the accessing of the IoT server, and presenting the collected state on the screen.

According to a third aspect of the present disclosure, there is provided a non-transitory computer-readable storage medium storing instructions that, when executed by a processor of a device, cause the device to perform a method for detecting a state of a networking channel, the method comprising: determining a smart device to be detected; selecting an Internet of Things (IoT) control protocol used by the smart device, and accessing an IoT server via a networking channel used by the smart device; and collecting a state of the networking channel during the accessing of the IoT server, and presenting the collected state on a screen of the device.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
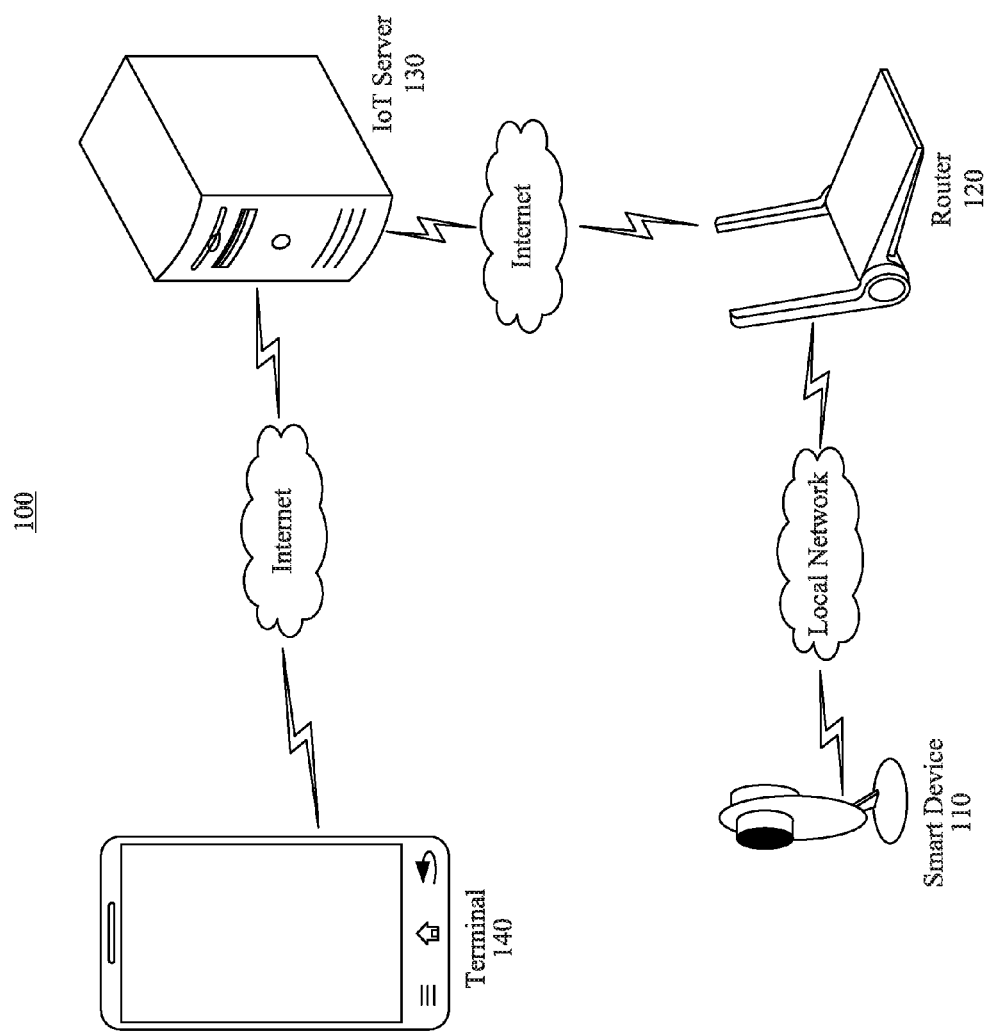
FIG. 1 is a schematic diagram illustrating an Internet of Things, according to an exemplary embodiment.

FIG. 1 is a schematic diagram illustrating an Internet of Things (IoT) 100, according to an exemplary embodiment. Referring to FIG. 1, the IoT 100 may include a smart device 110, a router 120, an IoT server 130, and a terminal 140. For example, the smart device 110 may be a smart camera. The smart device 110 may join a local network established by the router 120, so as to connect to the Internet via the router 120 and remotely access the IoT server 130. In the illustrated embodiment, a networking channel may be formed between the smart device 110 and the IoT server 130.

When the networking channel is in a normal state, the smart device 110 may successfully establish a remote connection with the IoT server 130. A user may use the terminal 140 to log into the IoT server 130. The terminal 140 may be, for example, a mobile phone or a computer, and is capable of accessing the Internet. The user may use the terminal 140 to send control instructions to the smart device 110 via the IoT server 130, and remotely control the smart device 110.

In some embodiments, due to instabilities of the network environment, the networking channel may be vulnerable to malfunctions. As a result, a user may not be able to remotely control the smart device 110. In addition, the smart device 110 may not have a display screen, and thus may not directly notify a user of the current state of the networking channel or causes to the malfunctions. To improve user experience, the following disclosed methods and devices may be used.

Figure 2:
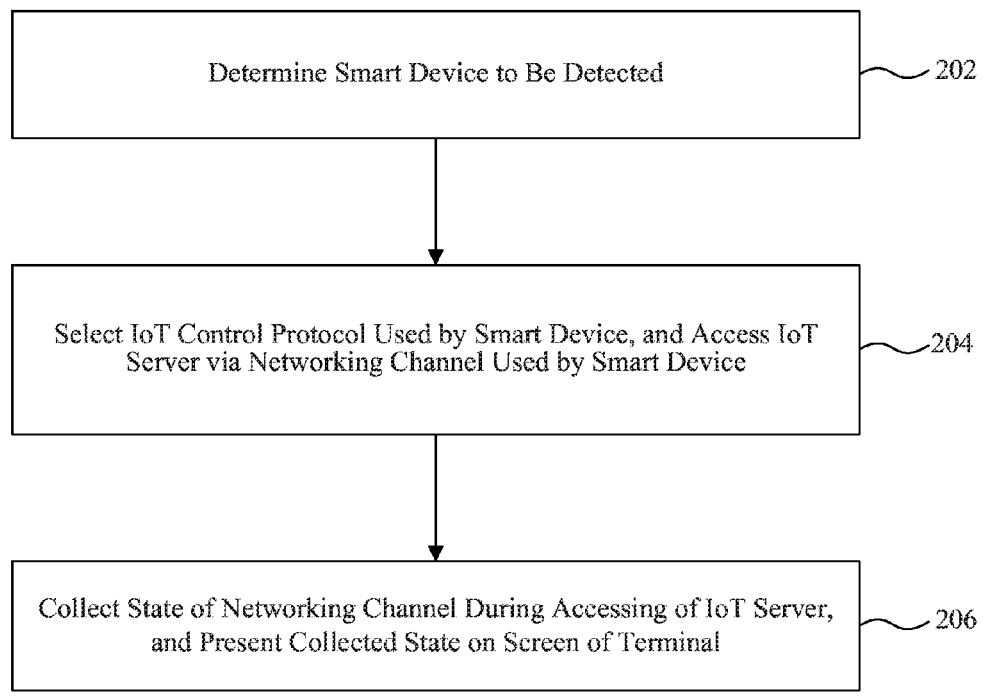
FIG. 2 is a flowchart of a method for detecting a state of a networking channel, according to an exemplary embodiment.

FIG. 2 is a flowchart of a method 200 for detecting a state of a networking channel, according to an exemplary embodiment. For example, the method 200 may be used in a terminal, such as the terminal 140 (FIG. 1). Referring to FIG. 2, the method 200 may include the following steps.

In step 202, the terminal determines a smart device for which a state of a networking channel is to be detected, also referred to herein as a smart device to be detected.

For example, the terminal may determine a smart device to be detected according to a detected user operation, such as a selection operation. Also for example, the terminal may automatically judge whether it is needed to detect a state of a networking channel used by a smart device.

In an exemplary embodiment, the terminal may send a control instruction to an IoT server for controlling a target smart device. And then based on a corresponding control result returned by the IoT server, the terminal may determine the target smart device as the device to be detected. For example, if the control instruction fails to be accomplished, the terminal may record the target smart device as the smart device to be detected.

Moreover, the terminal may detect a real-time network environment in which the terminal operates. If the networking channel used by the smart device is reachable under the real-time network environment, the terminal may generate a prompt for detecting the networking channel used by the smart device. Accordingly, the method 200 may enable a user to promptly detect the state of the networking channel so as to maintain the remote control of the smart device.

In step 204, the terminal selects an IoT control protocol used by the smart device to be detected, and accesses an IoT server via a networking channel used by the smart device to be detected.

In exemplary embodiments, the networking channel may include a local network channel between the smart device and a local router, and a cloud network channel between the local router and the IoT server. The state of the networking channel may include at least one of the following: a result of connecting to a local network established by the local router, a network state of the local network, open or close states of ports on the local router for accessing the IoT server, or a response state of the IoT server.

In step 206, the terminal collects a state of the networking channel during the accessing of the IoT server, and presents the collected state on a screen of the terminal.

The method 200 uses the terminal to simulate the accessing of an IoT server by a smart device, and to present the state of a networking channel on a screen of the terminal. This way, a user may visually examine a status of the networking channel. Therefore, the method 200 may cure the deficiencies due to some smart devices' inability to display information regarding the state of the networking channel and may improve the user experience.

Figure 3:
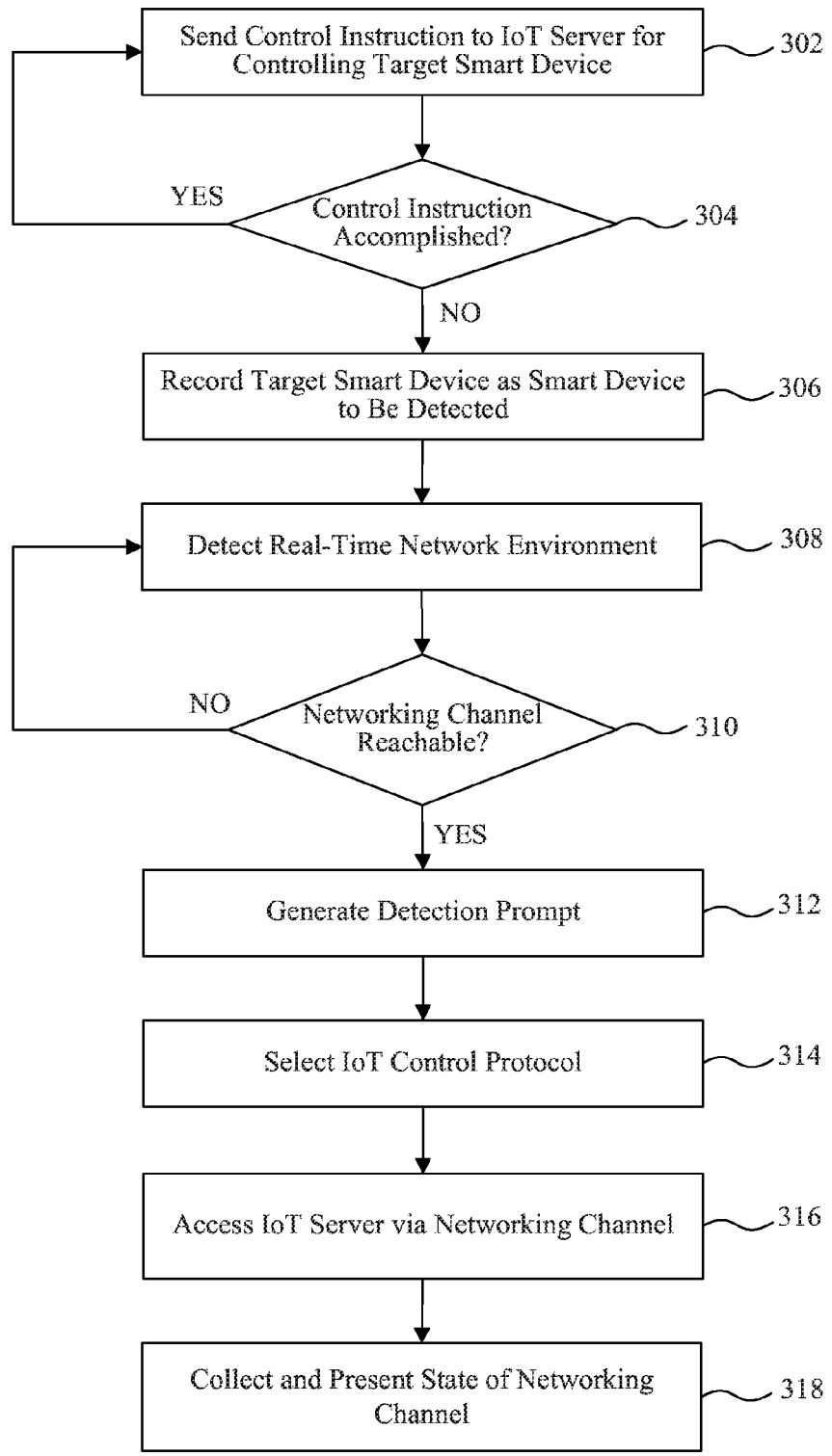
FIG. 3 is a flowchart of a method for detecting a state of a networking channel, according to an exemplary embodiment.

FIG. 3 is a flowchart of a method 300 for detecting a state of a networking channel, according to an exemplary embodiment. For example, the method 300 may be used in a terminal, such as the terminal 100 (FIG. 1). Referring to FIG. 3, the method 300 may include the following steps.

In step 302, the terminal sends a control instruction to an IoT server for remotely controlling a target smart device.

Figure 4:
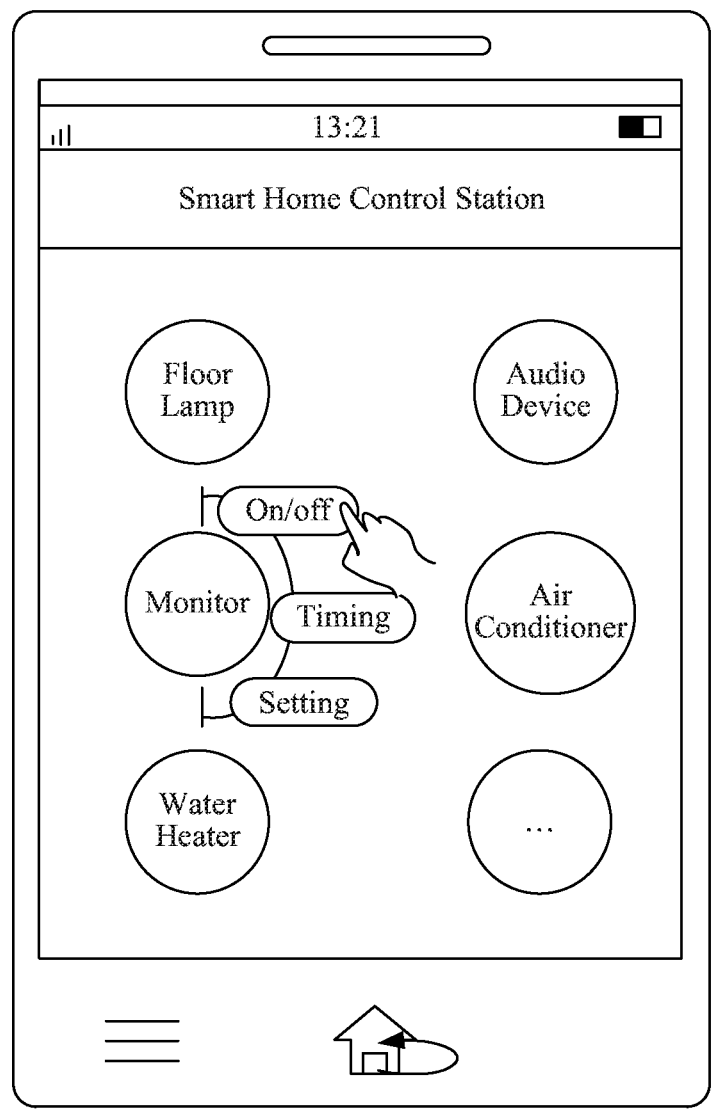
FIGS. 4-8 are schematic diagrams illustrating a user interface of a terminal for detecting a state of a networking channel, according to an exemplary embodiment.

FIG. 4 is a schematic diagram illustrating a user interface of a terminal for implementing the method 300, according to an exemplary embodiment. For example, the terminal may be a mobile phone. As shown in FIG. 4, the mobile phone is used to control a monitoring device, such as a smart camera. A user may select "monitor" on the mobile phone and open a menu including various operating options, such as "on/off", "timing", "setting," and so on. The user may use the menu to send control instructions to control the smart camera. For example, if the user selects the "on/off" key in FIG. 4 by tapping the key, the terminal may send an activating instruction to the IoT server, with the target smart device specified to be the "monitor," i.e., the smart camera.

In step 304, the terminal determines whether the control instruction is accomplished, according to information returned by the IoT server. If the control instruction is accomplished, the method 300 ends. Otherwise, the terminal proceeds to step 306.

In the present embodiment, the accomplishment of a control instruction means that the control instruction sent from the terminal is performed correctly by the target smart device. For example, when the user sends the above-described activating instruction, the instruction is accomplished if the smart camera successfully turns on.

Figure 5:
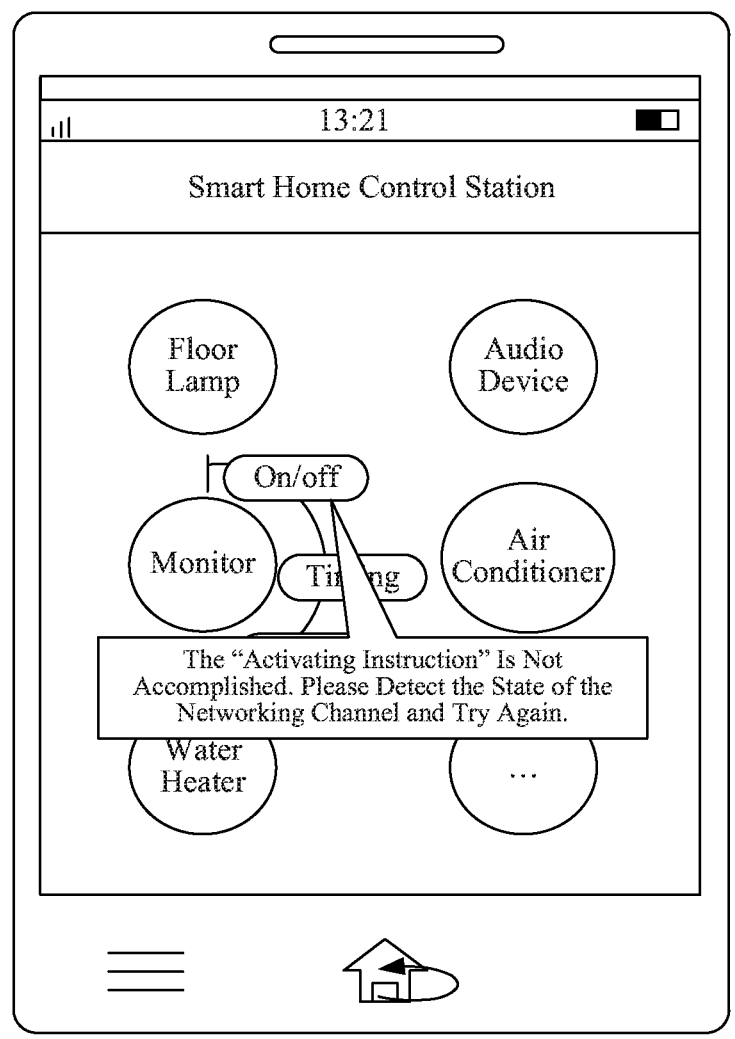

After receiving the control instruction from the terminal, the IoT server sends the control instruction to the target smart device via a networking channel. If the control instruction is accomplished, the target smart device may return a response message to the IoT server. However, if the response message received by the IoT server indicates that the control instruction is not accomplished or if no response message is received, the terminal may determine that the target smart device did not accomplish the control instruction. As shown in FIG. 5, if the above-described smart camera did not accomplish the activating instruction, the mobile phone may display on its screen a prompting message stating, for example, "The 'activating instruction' is not accomplished. Please detect the state of the networking channel and try again."

In step 306, the terminal records the target smart device as a smart device for which a state of a networking channel is to be detected, also referred to herein as a smart device to be detected.

For a smart device that does not accomplish a control instruction, the terminal may automatically record the smart device as a smart device to be detected, so that the state of the networking channel used by the smart devices may be detected if the real-time network environment permits.

In step 308, the terminal detects a real-time network environment where the terminal operates.

In step 310, if the networking channel of the smart device to be detected is reachable under the real-time network environment, the terminal proceeds to step 312. Otherwise, the terminal returns to step 308.

Figure 6:
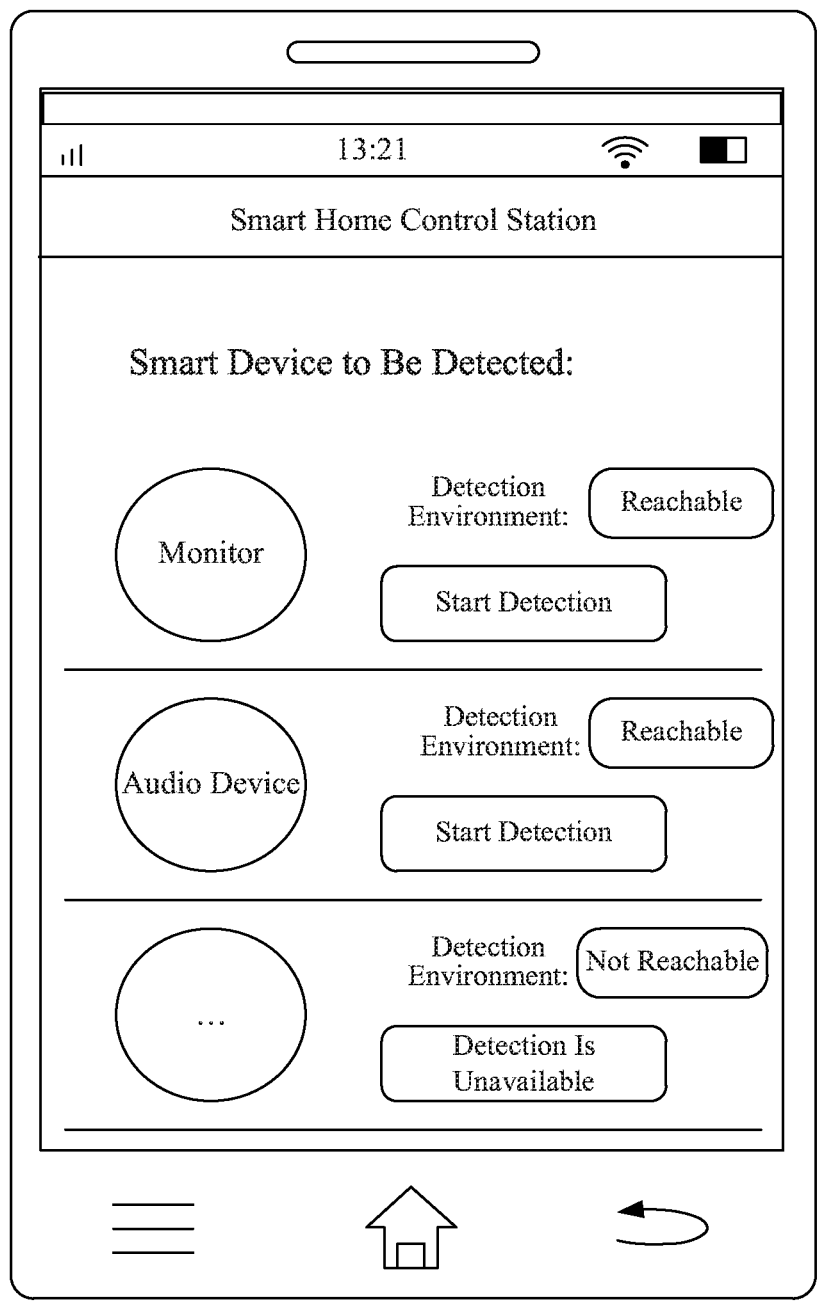

As shown in FIG. 6, on the above-described mobile phone, the user may view recorded smart devices that are to be detected. Moreover, for each recorded smart device, the terminal may detect the respective real-time network environment to determine whether the respective networking channel is reachable. The terminal may display on its screen whether each recorded smart device is reachable. The real-time network environments of the "monitor" and "audio device" are "reachable", and the user may tap the respective "starting detection" keys to initiate detection on the states of the networking channels used by these smart devices. In contrast, the other recorded smart devices are "not reachable", and thus the user cannot perform detection operation on the states of corresponding networking channels. Taking the IoT 100 illustrated by FIG. 1 as an example, the smart camera (i.e., the smart device 110) operates in the local network established by the router 120. If the mobile phone (i.e., the terminal 140) can join the local network, the mobile phone may reach the networking channel used by the smart camera.

In step 312, the terminal generates a detection prompt.

The terminal may prompt the user in any suitable manner. For example, the terminal may display a text message, make a prompting sound, and/or flash a light.

In step 314, the terminal selects an IoT control protocol used by the smart device to be detected.

In step 316, the terminal uses the selected IoT control protocol to access the IoT server via the networking channel used by the smart device to be detected.

By using the IoT control protocol of the smart device to be detected, the terminal may simulate the interaction between the smart device to be detected and the IoT server. This way, the terminal may determine a reason why the smart device may not be remotely controlled.

In step 318, during the accessing of the IoT server, the terminal collects and presents the state of the networking channel.

In exemplary embodiments, the networking channel may include a local network channel between the smart device and a local router, and a cloud network channel between the local router and the IoT server. Accordingly, the detection of the state of the networking channel may include two phases. In the first phase, the terminal may establish a connection to the local router via the local network channel. In the second phase, the terminal may access the IoT server via the cloud network channel.

The state of the networking channel may include any information representing the network state of the networking channel. For example, the state of the networking channel may include at least one of the following four types of information.

The first type of information may be a result of connecting to the local network established by the local router. The result may include successful connection, failed connection, the duration for establishing the connection, and the like;

The second type of information may be a state of the local network, including signal strength, data transmission rate, and the like.

The third type of information may be the open or close states of ports on the local router for accessing the IoT server. For example, the open or close states may indicate whether the local router opens a port for a smart device to access the IoT server.

The fourth type of information may be a response state of the IoT server, including whether the IoT server responds, the response speed, the response delay, and the like.

Figure 7:
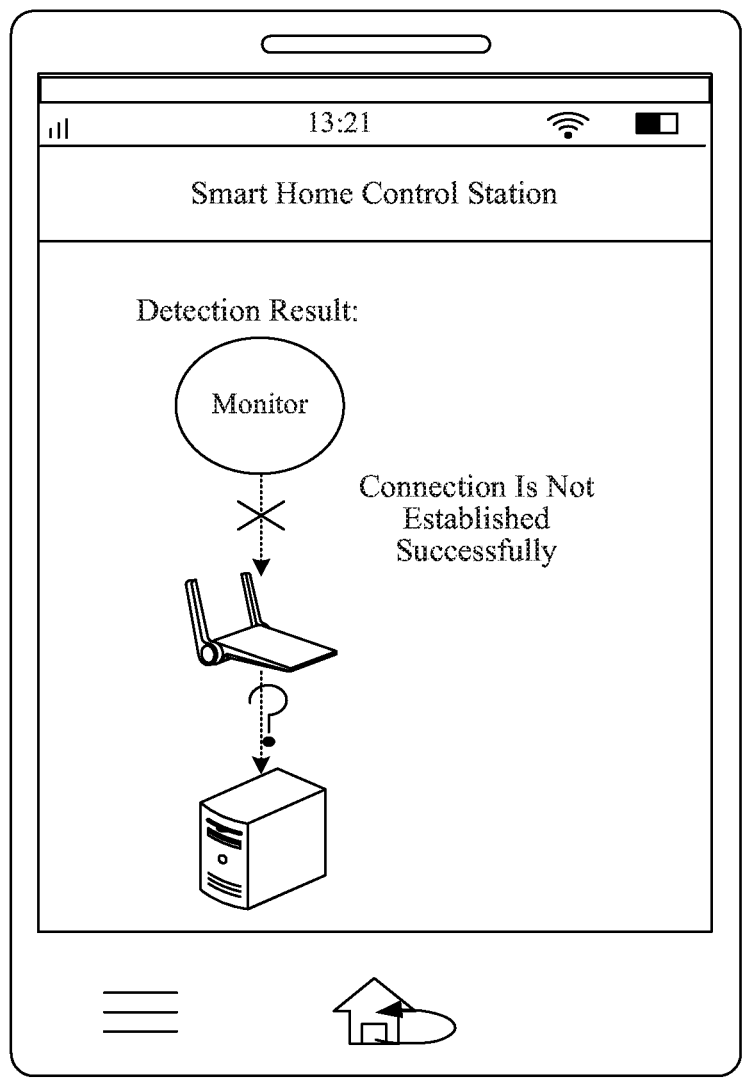
Figure 8:
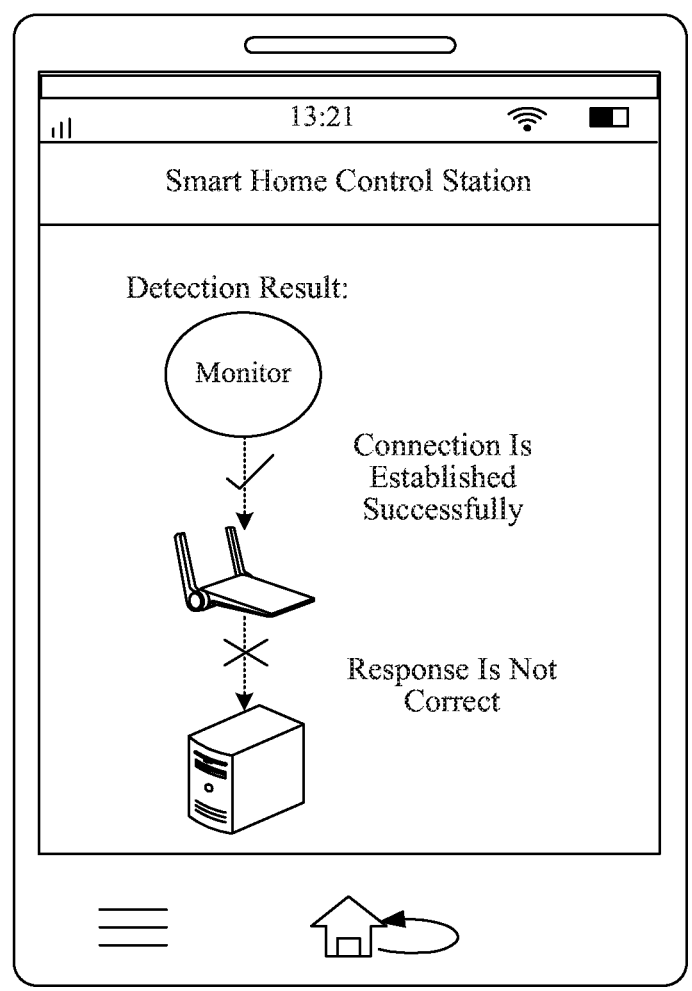

Based on the collected state of the networking channel, the terminal may display the detection results on a screen. For example, as shown in FIG. 7, the user interface of the terminal may indicate that the local network channel is abnormal and, in particular, the local router encounters a connection problem. Also for example, as shown in FIG. 8, the user interface of the terminal may indicate that the local network channel is normal, but the cloud network channel is abnormal. The reason may be that the local router forbids the smart device from using a port to access the IoT server, or that the IoT server malfunctions.

Figure 9:
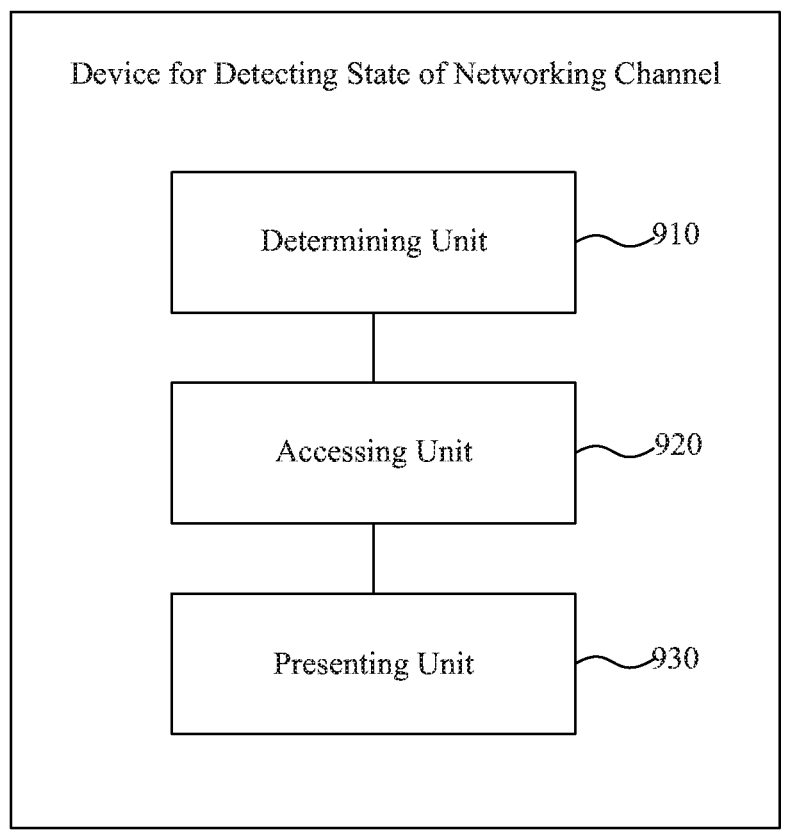
FIG. 9 is a block diagram of a device for detecting a state of a networking channel, according to an exemplary embodiment.

FIG. 9 is a block diagram of a device 900 for detecting a state of a networking channel, according to an exemplary embodiment. Referring to FIG. 9, the device 900 may include a determining unit 910, an accessing unit 920, and a presenting unit 930.

The determining unit 910 is configured to determine a smart device for which a state of a networking channel is to be detected, also referred to herein as a smart device to be detected. The accessing unit 920 is configured to select an IoT control protocol used by the smart device, and to access an IoT sever via the networking channel used by the smart device. The presenting unit 930 is configured to collect a state of the networking channel during the accessing of the IoT server, and to present the collected state on a screen of a terminal.

In some embodiments, the networking channel may include a local network channel between the smart device and a local router, and a cloud network channel between the local router and the IoT server.

In some embodiments, the state of the networking channel may include at least one of the following: a result of connecting to the local network established by the local router, a network state of the local network, open or close states of ports on the local router for accessing the IoT server, or a response state of the IoT server.

Figure 10:
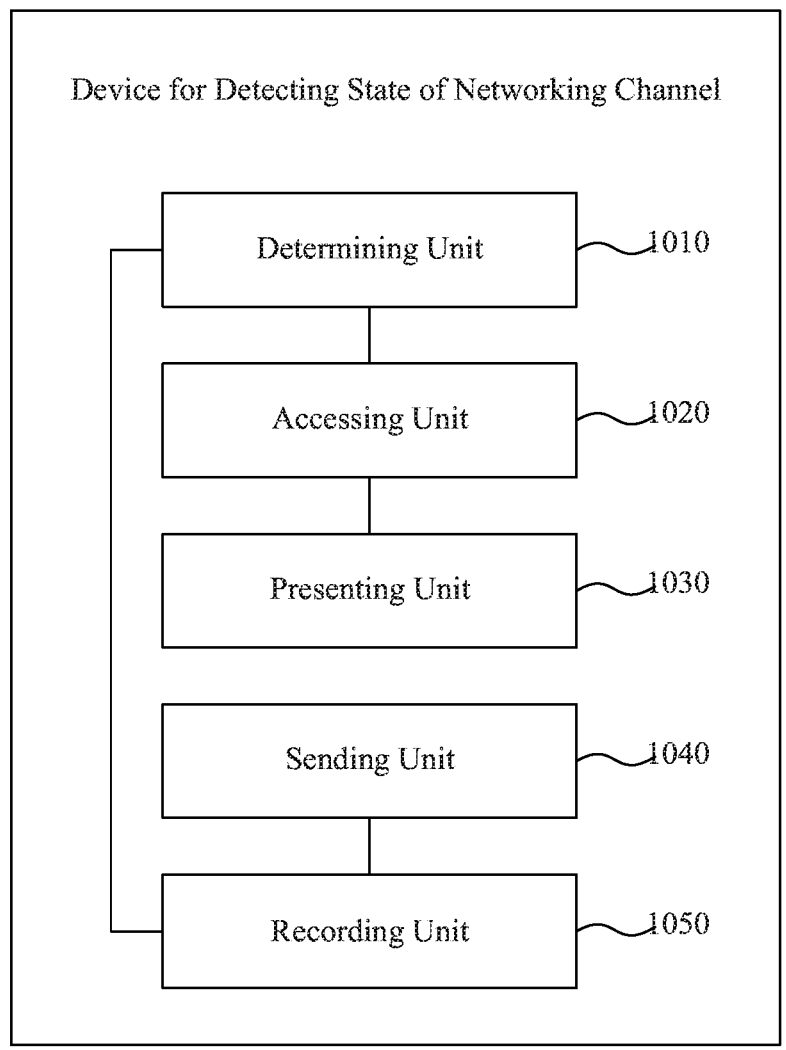
FIG. 10 is a block diagram of a device for detecting a state of a networking channel, according to an exemplary embodiment.

FIG. 10 is a block diagram of a device 1000 for detecting a state of a networking channel, according to an exemplary embodiment. Referring to FIG. 10, the device 1000 may include a determining unit 1010, an accessing unit 1020, and a presenting unit 1030, similar to the determining unit 910, the accessing unit 920, and the presenting unit 930 (FIG. 9), respectively. In some embodiments, the device 1000 may further include a sending unit 1040 and a recording unit 1050.

The sending unit 1040 is configured to send a control instruction to the IoT server for controlling a smart device. And the recording unit 1050 is configured to determine a control result returned by the IoT server, and record the smart device as the smart device to be detected if the control instruction is not accomplished.

Figure 11:
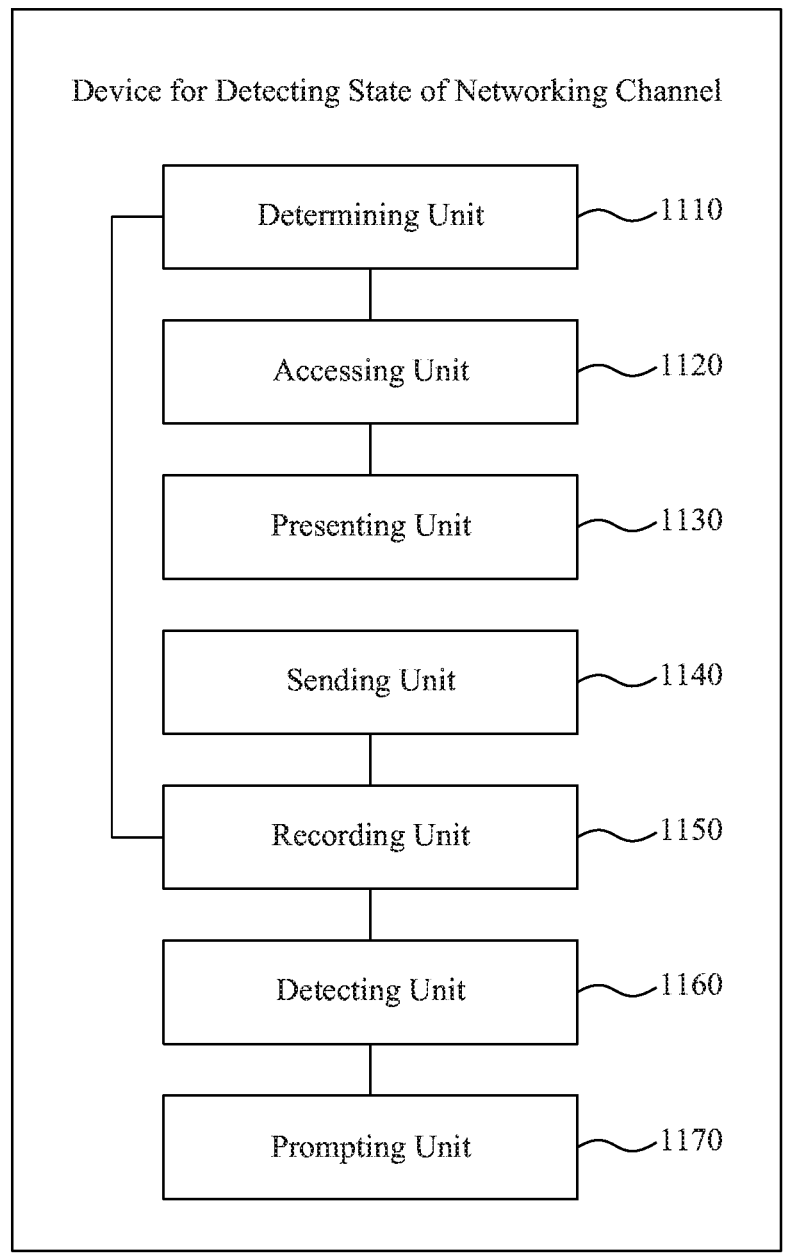
FIG. 11 is a block diagram of a device for detecting a state of a networking channel, according to an exemplary embodiment.

FIG. 11 is a block diagram of a device 1100 for detecting a state of a networking channel, according to an exemplary embodiment. Referring to FIG. 11, the device 1100 may include a determining unit 1110, an accessing unit 1120, a presenting unit 1130, a sending unit 1140, and a recording unit 1150, similar to the respective units in the devices 900 and 1000 (FIGS. 9 and 10). In some embodiments, the device 1100 may further include a detecting unit 1160 and a prompting unit 1170.

The detecting unit 1160 is configured to detect a real-time network environment. The prompting unit 1070 is configured to generate a prompt for detecting a networking channel used by a smart device if the networking channel is reachable under the real-time network environment.

Figure 12:
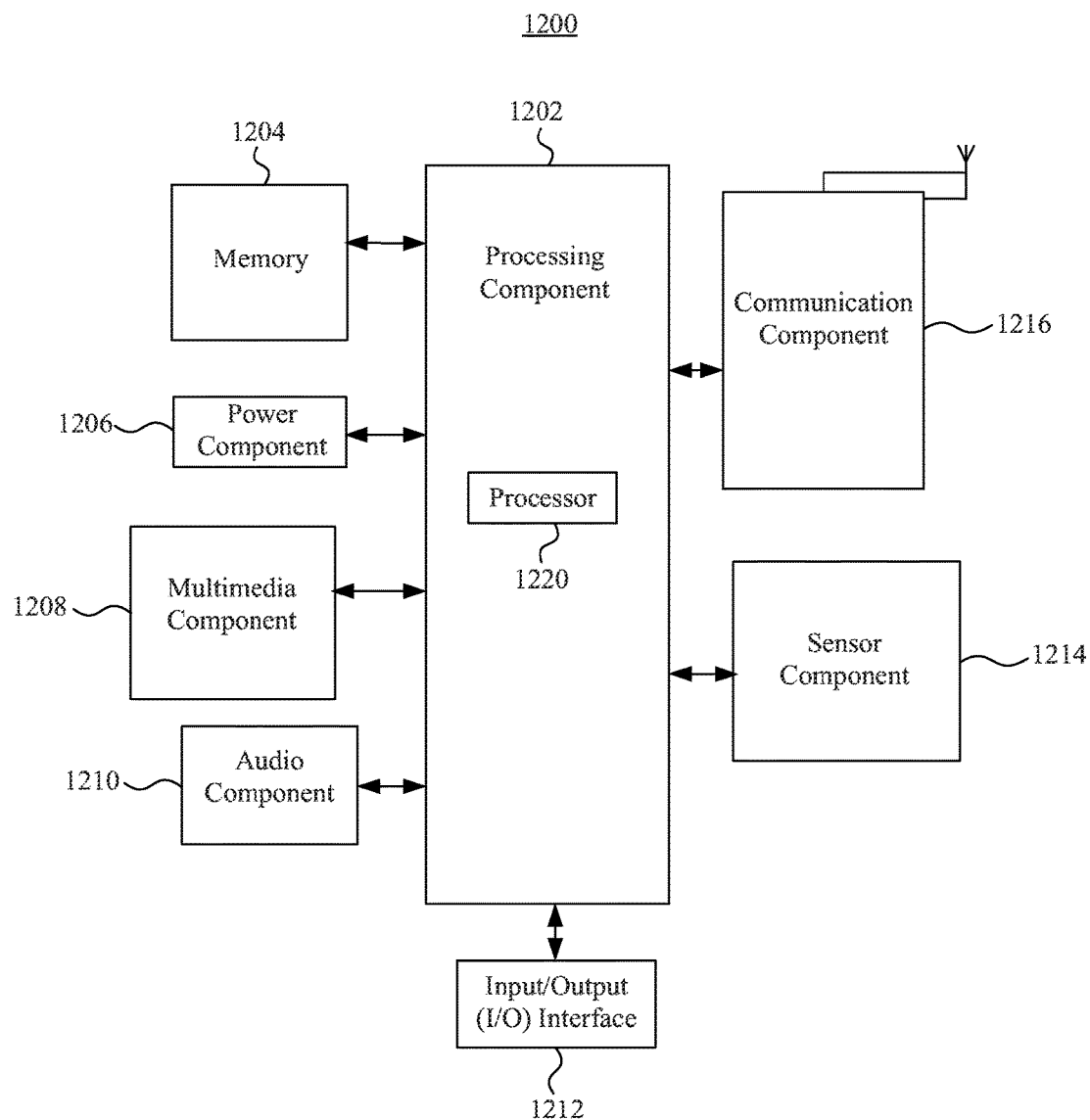
FIG. 12 is a block diagram of a device for detecting a state of a networking channel, according to an exemplary embodiment.

FIG. 12 is a block diagram of a device 1200 for detecting a state of a networking channel, according to an exemplary embodiment. For example, the device 1200 may be a mobile phone, a computer, a digital broadcast terminal, a messaging device, a gaming console, a tablet, a medical device, exercise equipment, a personal digital assistant, and the like.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive external multimedia data while the device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as WiFi, 2G, 3G, 4G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1204, executable by the processor 1220 in the device 1200, for performing the above-described methods. For example, the non-transitory computer-readable storage medium may be a read-only memory (ROM), a random access memory (RAM), a CD-ROM, a magnetic tape, a floppy disc, an optical data storage device, and the like.

One of ordinary skill in the art will understand that the above-described units can each be implemented by hardware, or software, or a combination of hardware and software. One of ordinary skill in the art will also understand that multiple ones of the above-described units may be combined as one unit, and each of the above-described units may be further divided into a plurality of sub-units.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact constructions that are described above and illustrated in the accompanying drawings, and that various modifications and changes can be made without departing from the scope thereof. It is intended that the scope of the invention only be limited by the appended claims.

What is claimed is:

1. A method performed by a terminal for detecting a state of a networking channel, the method comprising:
 determining a smart device to be detected, comprising:

sending a control instruction to an Internet of Things (IoT) server for controlling a target smart device; and
when a control result returned by the IoT server indicates that the control instruction is not accomplished, recording the target smart device as the smart device to be detected;
selecting an Internet of Things (IoT) control protocol used by the smart device to be detected;
accessing, based on the selected IoT protocol, the IoT server via a networking channel used by the smart device to be detected; and
collecting a state of the networking channel during the accessing of the IoT server, and presenting the collected state on a screen of the terminal.

2. The method according to claim 1, wherein the networking channel used by the smart device to be detected comprises:
a local network channel between the smart device to be detected and a local router; and
a cloud network channel between the local router and the IoT server.

3. The method according to claim 2, wherein the state of the networking channel comprises at least one of the following:
a result of connecting to a local network established by the local router;
a network state of the local network;
an open or close state of a port of the local router for accessing the IoT server; or
a response state of the IoT server.

4. The method according to claim 1, wherein the determining of the smart device to be detected further comprises:
detecting a real-time network environment; and
when the networking channel used by the smart device to be detected is reachable under the real-time network environment, generating a prompt for detecting the state of the networking channel.

5. An electronic device, comprising:
a processor;
a screen; and
a memory for storing instructions executable by the processor;
wherein the processor is configured to perform:
determining a smart device to be detected, comprising:
sending a control instruction to an Internet of Things (IoT) server for controlling a target smart device; and
when a control result returned by the IoT server indicates that the control instruction is not accomplished, recording the target smart device as the smart device to be detected;
selecting an Internet of Things (IoT) control protocol used by the smart device to be detected;
accessing, based on the selected IoT protocol, the IoT server via a networking channel used by the smart device to be detected; and
collecting a state of the networking channel during the accessing of the IoT server, and presenting the collected state on the screen.

6. The electronic device according to claim 5, wherein the networking channel used by the smart device to be detected comprises:
a local network channel between the smart device to be detected and a local router; and
a cloud network channel between the local router and the IoT server.

7. The electronic device according to claim 6, wherein the state of the networking channel comprises at least one of the following:
a result of connecting to a local network established by the local router;
a network state of the local network;
an open or close state of a port of the local router for accessing the IoT server; or
a response state of the IoT server.

8. The electronic device according to claim 5, wherein the processor is further configured to perform:
detecting a real-time network environment; and
when the networking channel used by the smart device to be detected is reachable under the real-time network environment, generating a prompt for detecting the state of the networking channel.

9. A non-transitory computer-readable storage medium storing instructions that, when executed by a processor of a device, cause the device to perform a method for detecting a state of a networking channel, the method comprising:
determining a smart device to be detected, comprising:
sending a control instruction to an Internet of Things (IoT) server for controlling a target smart device; and
when a control result returned by the IoT server indicates that the control instruction is not accomplished, recording the target smart device as the smart device to be detected;
selecting an Internet of Things (IoT) control protocol used by the smart device to be detected;
accessing, based on the selected IoT protocol, the IoT server via a networking channel used by the smart device to be detected; and
collecting a state of the networking channel during the accessing of the IoT server, and presenting the collected state on a screen of the device.

10. The storage medium according to claim 9, wherein the networking channel used by the smart device to be detected comprises:
a local network channel between the smart device to be detected and a local router; and
a cloud network channel between the local router and the IoT server.

11. The storage medium according to claim 10, wherein the state of the networking channel comprises at least one of the following:
a result of connecting to a local network established by the local router;
a network state of the local network;
an open or close state of a port of the local router for accessing the IoT server; or
a response state of the IoT server.

12. The storage medium according to claim 9, wherein the determining of the smart device to be detected further comprises:
detecting a real-time network environment; and
when the networking channel used by the smart device to be detected is reachable under the real-time network environment, generating a prompt for detecting the state of the networking channel.

13. The method according to claim 2, wherein the accessing of the IoT server via the networking channel used by the smart device to be detected further comprises:
connecting the terminal to the local router via the local network channel; and
accessing the IoT server via the cloud network channel.

14. The electronic device according to claim 6, wherein the processor is further configured to perform:

connecting the electronic device to the local router via the local network channel; and
accessing the IoT server via the cloud network channel.

15. The storage medium according to claim 10, wherein the accessing of the IoT server via the networking channel used by the smart device to be detected further comprises:
connecting the device to the local router via the local network channel; and
accessing the IoT server via the cloud network channel.

* * * * *